United States Patent [19]

Nudd, Jr. et al.

[11] Patent Number: 4,693,121
[45] Date of Patent: Sep. 15, 1987

[54] DIFFERENTIAL-PRESSURE MEASURING APPARATUS WITH IMPROVED OVERPRESSURE PROTECTION

[75] Inventors: Howard W. Nudd, Jr., Foxboro; David N. De Moura, Taunton, both of Mass.

[73] Assignee: The Foxboro Company, Foxboro, Mass.

[21] Appl. No.: 741,538

[22] Filed: Jun. 5, 1985

[51] Int. Cl.$^4$ .......................... G01L 7/08; G01L 9/00
[52] U.S. Cl. ........................................ 73/706; 73/720
[58] Field of Search .................. 73/716, 717, 718, 719, 73/720, 721, 722, 706; 92/97, 81, 110

[56] References Cited

U.S. PATENT DOCUMENTS

| | | | |
|---|---|---|---|
| 3,085,437 | 4/1963 | Osterstrom | 73/716 |
| 3,712,143 | 1/1973 | Weaver et al. | 73/720 |
| 4,546,653 | 10/1985 | Tobita et al. | 73/721 |

Primary Examiner—Donald O. Woodiel
Attorney, Agent, or Firm—Parmelee, Bollinger & Bramblett

[57] ABSTRACT

A differential-pressure instrument the body of which forms a sealed interior pressure chamber containing a fill-liquid and includes a pair of flexible diaphragms to apply to the fill-liquid an input differential pressure to be sensed by an IC strain-gauge chip within the chamber. A spring plate divides the interior pressure chamber into two sections and is deflectable in response to differential pressures. Overrange pressure protection is provided by a valve which is closable by an elastomeric pad carried by the spring plate when the plate deflection reaches a pre-set amount. Valve closure locks the fill-liquid in place alongside the plate to provide an incompressible liquid back-up preventing further deflection of the plate, thus preventing further increases in differential pressure across the IC chip. In one embodiment, valves are placed on both sides of the spring plate to protect against both high-side and low-side overrange pressures. In another embodiment, a washer is secured to the spring plate to provide a relatively high spring-rate for deflection in the high-side direction, so that the instrument can more readily be employed for measuring high-span differential pressures.

18 Claims, 12 Drawing Figures

DIFFERENTIAL-PRESSURE MEASURING APPARATUS WITH IMPROVED OVERPRESSURE PROTECTION

BACKGROUND OF THE INVENTION

1. Field of the Invention

This invention relates to differential-pressure measuring apparatus adapted for use with industrial processes. More particularly, this invention relates to improvements in such apparatus for preventing damage due to overrange pressure conditions.

2. Description of the Prior Art

Differential pressures in industrial processes are measured for a wide variety of purposes. The largest application probably is that of flow-measurement, wherein the instrument measures the differential pressure produced across an orifice plate in a flow pipe in order to develop a fluid flow-rate signal. There are however many other applications, such as measurement of pressure drops across pumps, valves or the like.

For many years, differential-pressure measuring apparatus typically comprised transmitters of the force-balance type, such as shown in U.S. Pat. No. 3,564,923, issued to H. W. Nudd, et al. In recent years, transmitters which do not employ force-balance techniques have grown in importance. U.S. Pat. No. 4,165,651 (E. O. Olsen et al) shows one such design having important advantages.

Differential-pressure instruments typically include a sealed interior pressure chamber containing a fill-liquid. A pair of flexible diaphragms are mounted at opposite ends of the pressure chamber to apply an input differential pressure to the fill-liquid. In one advantageous arrangement, the pressure differential applied to the fill-liquid is sensed by an IC strain-gauge chip mounted within the sealed chamber. The present invention is disclosed hereinbelow as embodied in such a strain-gauge type of instrument, but it will be clear that the invention can by employed with other types of instruments.

Differential-pressure instruments need special protection from overrange pressure conditions, especially to prevent damage to the commonly used pressure-sensing devices such as an IC chip as described above. Overrange pressures develop in various ways, frequently by operator error. For example, when an instrument is being placed into or taken out of service, the operator may inadvertently allow full static pressure (e.g. 2000 psi) to be connected to only one side of the instrument. With an instrument designed to handle differential pressures of, say, 20 psi maximum (as in flow measurements), the application of 2000 psi to only one side will, unless effective protective measures are taken, almost certainly destroy the instrument.

One approach to providing protection against overrange pressures is to employ back-up plates for the flexible diaphragms, as disclosed for example in the above-mentioned Olsen et al patent. In such a design, each flexible diaphragm is arranged to bottom on the corresponding back-up plate in response to an overrange differential pressure. This prevents further movement of the diaphragm, and thus prevents transfer of any additional fill-liquid from the region adjacent the bottomed diaphragm.

Although this approach can be effective in certain applications, such as in the above Olsen et al patent, where the instrument sensor effectively responds to the force developed by a range diaphragm, problems are encountered when this approach is applied to instruments wherein the sensor employs a third diaphragm or plate which deflects with differential pressure thus allowing the slack diaphragm to deflect until it bottoms on its back-up plate. For example, because the volume of the fill-liquid expands and contracts with changes in instrument temperature, the amount of differential pressure required to effect bottoming of the diaphragm on its back-up plate varies correspondingly. Prior designs of apparatus for achieving overrange protection also have been relatively costly to manufacture, and particularly have not been well adapted for use in a multi-model family of essentially identical instruments for covering the full range of spans needed for industrial processes.

SUMMARY OF THE INVENTION

In one preferred embodiment to be described hereinbelow in detail, the invention is employed in an instrument of the type including a sealed interior pressure chamber containing a fill-liquid and having a pair of flexible diaphragms through which the input differential pressure is applied to the fill-liquid to be sensed by an IC strain-gauge chip. In accordance with a principal aspect of the invention, the instrument further comprises a spring plate dividing the sealed chamber into a pair of sealed sections. This plate is deflectable by the applied differential pressure. A valve is positioned at one side of the spring plate to be closed by deflection of the spring plate when the differential pressure reaches a pre-set level.

Closure of this valve seals off liquid communication between (a) the fill-liquid region immediately adjacent the spring plate, on the valve side, and (b) the remainder of the fill-liquid in that section of the pressure chamber (primarily the fill-liquid adjacent the flexible diaphragm for that section). The fill-liquid immediately adjacent the spring plate is thereby locked in place, and provides an effective back-up preventing further deflection of the plate. Thus, the differential pressure across the plate (and also across the IC chip serving as the pressure-sensor) is limited to the amount which produce the deflection causing closure of the valve.

In most instruments employing the invention, valves will be placed on both sides of the spring plate in order to protect against overrange pressures in either direction. In such an arrangement, the two valves function in identical fashion, as described above.

With this invention, the overrange pressure setting is not affected by temperature because it is determined by the spacing between the valve and the spring plate. This spacing is fixed at the time of manufacture and is the same for all temperatures.

Other objects, aspects and advantages of the invention will in part be pointed out in, and in part be apparent from, the following description of preferred embodiments of the invention, considered together with the accompanying drawings.

DESCRIPTION OF THE PREFERRED EMBODIMENTS

Figure 1:
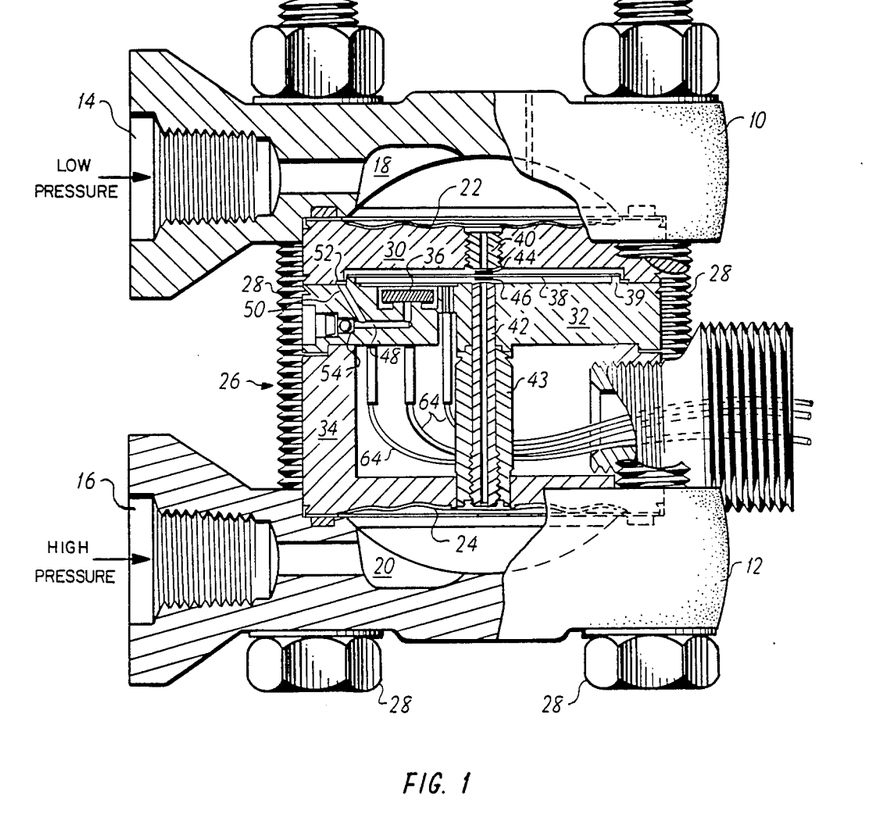
FIG. 1 is a section view, partly in elevation, showing a differential-pressure instrument based on the present invention.

Referring now to FIG. 1, there is shown a differential-pressure meter comprising upper and lower housings 10, 12 formed with process pressure connections 14, 16 for the low and high input pressures respectively. These input pressures are directed through passages 18, 20 to respective flexible diaphragms 22, 24. (Note: The normal operating position of the instrument is with the diaphragms in a vertical plane, but the instrument is shown rotated 90° to simplify the description which follows.)

The diaphragms 22, 24 form part of a cylindrical differential-pressure cell generally indicated at 26, and secured firmly between the upper and lower housings 10, 12 by a set of bolts 28. This cell 26 comprises a three-part assembly, with a generally disc-shaped support member 30 at the top, a generally disc-shaped header 32 beneath the support member 30, and a cylindrical cup member 34 at the bottom.

The diaphragms 22, 24 are so-called slack diaphragms, having spring rates as low as possible (ideally zero). These two diaphragms together with the associated body structure of the cell 26 define a sealed interior pressure chamber containing a fill-liquid, e.g. a silicone oil of relatively low viscosity. The differential pressure applied to the diaphragms is the input signal to the instrument, and is sensed by an IC strain gauge chip 36 within the header 32, in a manner to be described.

Adjacent the IC chip 36 is a circular spring plate 38 which is welded at its periphery to a support ring 39 so as to divide the sealed interior pressure chamber of the cell 26 into two separate sections. Process pressure applied to the upper diaphragm 22 is transferred to the upper surface of this spring plate by fill-liquid in the central bore of a relatively short tubular valve body 40 presenting a valve seat at its lower end and threadedly mounted in the support member 30. Similarly, process pressure applied to the lower diaphragm 24 is transferred to the lower surface of the spring plate by fill-liquid in the central bore of an elongate tubular valve body 42 presenting a valve seat at its upper end and threadedly mounted in a tube 43 coaxial with the cup member 34. The spring plate 38 deflects in response to the applied differential pressure in accordance with its spring rate. Normally, the spring plate will deflect upwardly, since the higher process pressure is on its lower surface.

The spring plate 38 carries at its center a pair of elastomeric pads 44, 46 engageable with one or the other of the valve seats of the valve bodies 40, 42 upon sufficient deflection of the plate. These pads may for example be made of resilient material such as "BUNA N" coated nylon fabric. When engaged with the valve seats of either of the valve bodies, these pads close off the internal passages of the valves so that no fill-fluid can flow through.

The differential pressure across the spring plate 38 appears also across the IC chip 36. For this purpose, the upper surface of the chip is exposed directly to the fill-liquid immediately below the spring plate 38, and the lower surface of the chip is connected through interior passageways 48, 50, 52 to the fill-liquid region immediately above the plate 38. A liquid-fill-port 54 connects to one of these passageways 48 to provide for inserting the fill-liquid into that section of the interior pressure chamber during manufacture; a second fill-port (not shown) is provided for the other fill-liquid section below the spring plate.

Figure 2A:
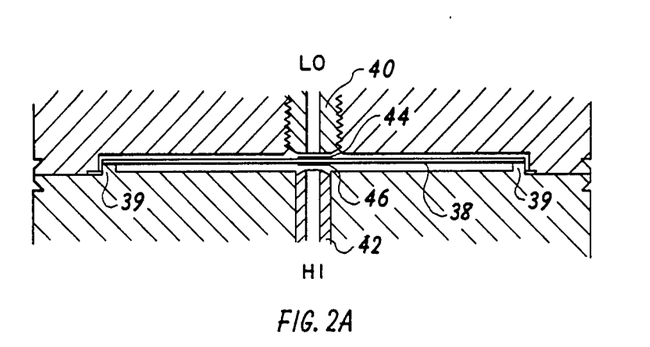
FIGS. 2A through 2C show the internal spring plate in different operating positions.

If there is no differential pressure across the spring plate 38, the plate will assume a neutral position as shown in FIG. 2A. If a normal or "high side" differential pressure is applied to the instrument, the spring plate 38 will deflect upwardly in accordance with the magnitude of the pressure. If this differential pressure exceeds a pre-set level (typically set at 150% of the instrument span), the spring plate will deflect to the position (see FIG. 2B) where the upper pad 44 closes off the upper valve 40. Thus, the fill-liquid in the region immediately adjacent the upper surface of the spring plate 38 is locked in place. That is, no more fill-liquid can be transferred from that region up to the region adjacent the upper slack diaphragm 22.

Figure 2B:
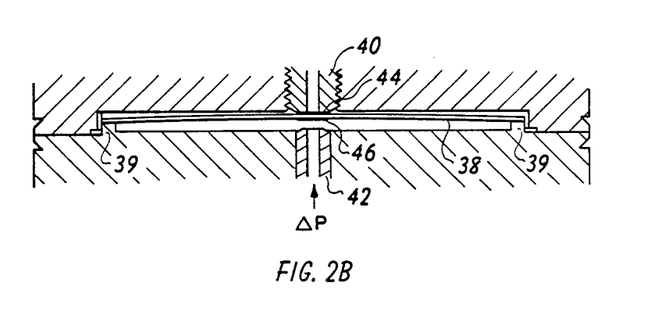

The fill-liquid thus locked into the space above the spring plate 38 serves as an effectively non-compressible back-up support for the spring plate. Any further increase in differential pressure beyond the pre-set overrange level simply increases correspondingly the pressure of this liquid back-up support. Accordingly, such additional differential pressure does not increase the differential pressure across the spring plate beyond the predetermined set level. Similarly, the differential pressure on the IC chip 36 also will not increase beyond the pre-set level at which the pad 44 closes off the valve 40.

Figure 2C:
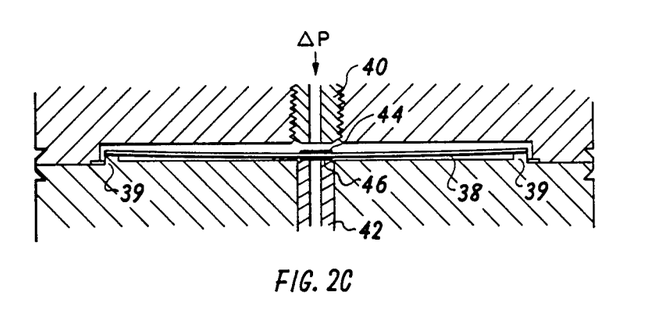

If, now, the overrange differential pressure occurs in the reverse or "low side" direction, i.e. where the pressure above the spring plate 38 exceeds the pressure below the plate, the spring plate will deflect downwardly. If that differential pressure exceeds a pre-set magnitude, the lower pad 46 will engage the valve seat of the lower valve 42 to close off that valve (see FIG. 2C). Thus, the fill liquid in the region immediately beneath the lower surface of the spring plate 38 will be locked in place, and will serve as a back-up support preventing any further downward deflection of that plate. As described above, this will limit the differential pressure across the plate 38 (and also across the IC chip 36) to the pre-set differential pressure producing the valve closure.

Figure 3:
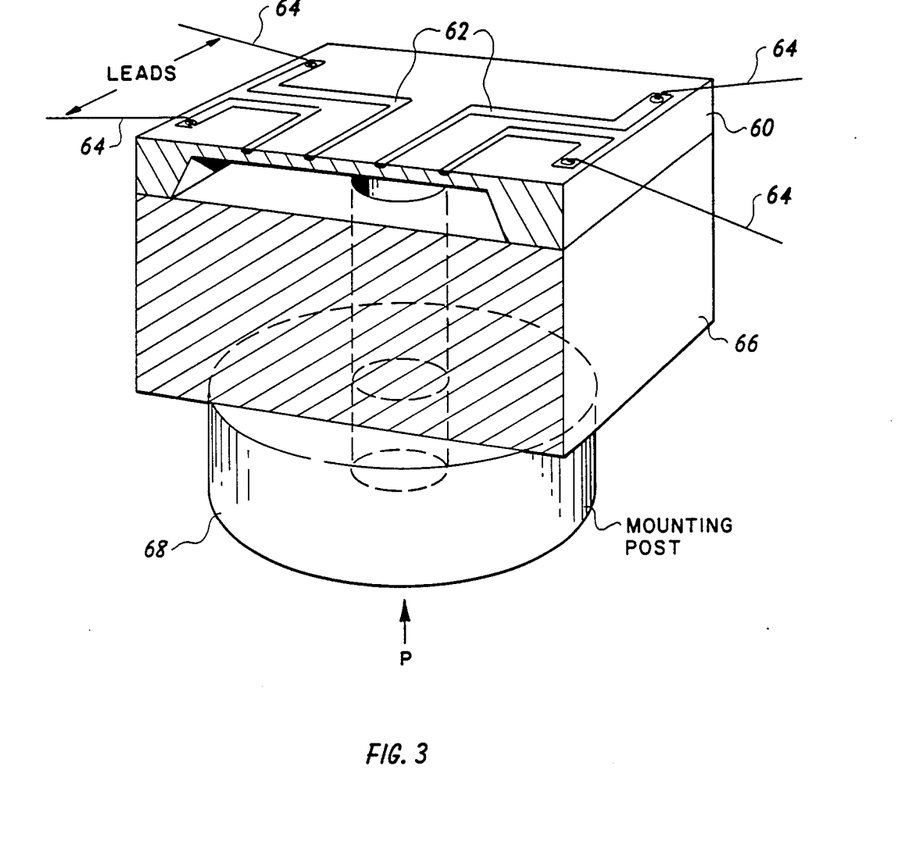
FIG. 3 is a perspective view, partly cut away, showing the IC strain gauge chip with its mounting post.

In the preferred embodiment described herein, the chip 36 is constructed in such a way that it is especially sensitive to low-side overrange differential pressures, i.e. wherein the pressure above the spring plate 38 is higher than that below the plate. Referring now to FIG. 3, the chip comprises an upper silicon part 60 carrying a set of diffused boron resistors 62 to which leads 64 are connected to develop the instrument output signal in known fashion. This silicon part is etched to an extremely small thickness (depending upon the instrument span) and is secured to a base member 66 conventionally formed of Pyrex to provide a matched temperature coefficient of expansion. With this configuration, it will be understood that the chip cannot withstand very great low-side differential pressures without the upper part 60 being lifted up from its support base 66, or the base 66 being lifted up from the post 68 to which it is adhesively secured. Thus, the low-side differential pressure overrange setting typically may be as low as about 15 psi, regardless of the span of the instrument, in order to assuredly prevent damage to the chip.

Figure 4:
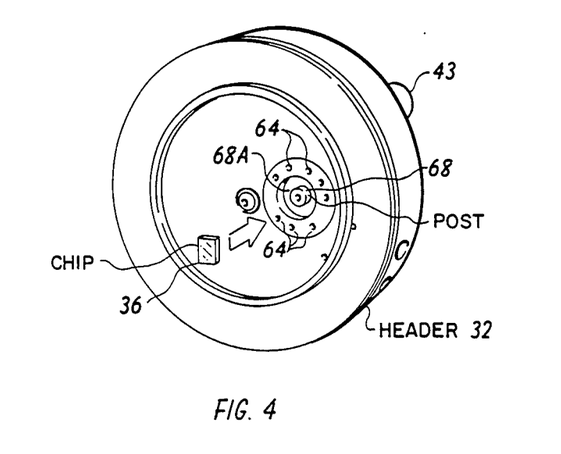
FIG. 4 is a perspective view showing how the IC strain gauge chip is assembled to the header.

FIG. 4 shows more clearly the relationship between the chip 36 and its mounting post 68, which is located in a small well 68A in the header 32. This post has a diameter smaller than either of the rectangular chip dimensions, and provides mechanical isolation between the chip and the remainder of the instrument. That is, stresses developed in the instrument from any of a variety of causes, such as bending or bolt stresses, etc., are not transmitted to the chip in significant measure, and thus do not alter the output signal developed by the differential-pressure-induced strains in the chip.

It may be noted that the valves 40, 42 close after a predetermined amount of movement of the spring plate 38 away from its zero-differential position. This arrangement lends itself well to economical manufacture, since during assembly the valves can be adjusted to the proper overrange pressure settings simply by rotating the valve bodies in their screw threads. That is, such rotation shifts the axial positioning of the valve bodies and thereby controls the amount of deflection required for valve closure. This makes it readily possible to set the valves for closure at a desired shut-off pressure.

The valve bodies as so adjusted can then be fixed in place and sealed in their threads by a conventional adhesive. This is superior to setting the valve closure by use of close machine tolerances in the parts. It also will be seen that the two valves 40, 42 can readily be set for close-off at different pressures, simply by adjusting their axial positions to provide different required deflections of the spring plate 38 for close-off.

In practice, the displacement of the pads 44, 46 required for valve closure may typically be about 0.006". Such small displacement avoids the need for a large volume of fill-liquid which in turn further reduces temperature errors caused by liquid volume changes working against the stiffness of the slack diaphragms (already a low value, by design).

For applications involving relatively high differential pressures, e.g. for spans in the hundreds of pounds, the use of a single spring plate 38 for both high and low side overrange protection is generally not appropriate. This is because, as discussed above, the chip 36 must always be protected on the low side against pressures greater than about 15 psi, regardless of the overrange setting for the high side. Thus, at high differentials, a single plate 38 would have to travel a much greater distance to close the high-side valve than to close the low-side valve. This could lead to excessive plate displacements and overly critical valve positioning.

Figure 5A:
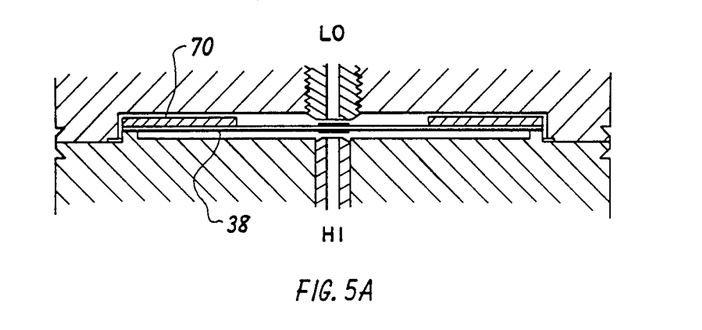
FIGS. 5A through 5C show a modified form of spring plate in different operating positions.
Figure 5B:
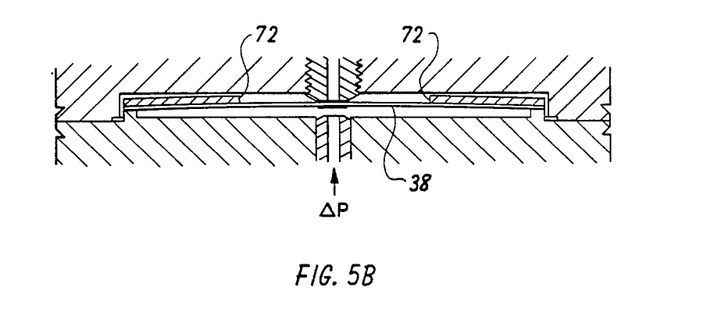

It has been found that this problem can be solved by a dual-plate arrangement such as illustrated in Figure 5A. This arrangement comprises a spring plate 38 as before, but additionally includes a relatively thick circular washer 70 secured at its outer edge to the periphery of the spring plate, e.g. by electron-beam welding, which also serves to fasten the composite plate structure to the ring 39. When a high-side overrange pressure develops, both the plate and washer deflect upwardly together, as shown in FIG. 5B, until the upper pad 44 closes off the upper valve 40. The spring constant of the washer and plate together is sufficiently high that the deflection required for such valve closure will still be relatively small for high differential pressures.

Figure 5C:
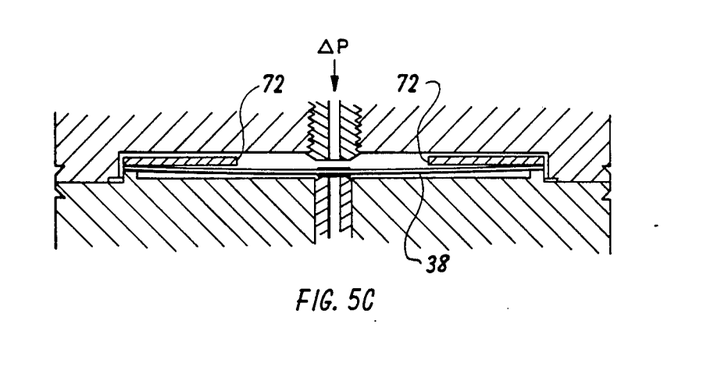

On a low side overrange, only the spring plate 38 will deflect. That is, the central portions of the spring plate will move independently of the washer, as shown in FIG. 5C. The hole 72 in the center of the washer allows the pressure of the fill-liquid to act on the plate 38 to effect such independent movement. Thus, it will be seen that the required deflection for valve closure on the low side can be achieved with a relatively low differential pressure, while at the same time providing for valve closure on the high side by a relatively large differential pressure.

Figure 6A:
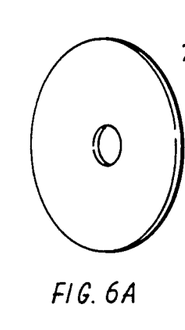
FIGS. 6A through 6C show different types of washers for use with the modified spring plate arrangement of FIGS. 5A through 5C.
Figure 6B:
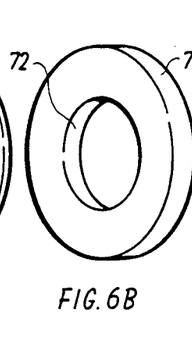

The thickness of the washer 70 and the diameter of the center hole 72 determine the effective spring rate of the washer. The thickner the washer, or the smaller the diameter, the greater the spring rate. Thus, a multi-model family of essentially identical instruments but with different-sized washers 70 can be provided for covering the full range of spans needed for industrial processes. For example, the washer 70 shown in FIGS. 5A-5C (and also FIG. 6B) can be used to provide an instrument with spans of between 0-25 psi and 0-100 psi (the 4:1 turn-down in span being effected by suitable electronic circuitry of known type to which the output leads 64 are connected, but not shown herein). For spans of 0-7.5 psi to 0-30 psi, a thinner washer with a smaller central hole may be used, as shown at 70A in FIG. 6A. Alternatively, for higher spans of from 0-75 psi to 0-300 psi, a washer of the same thickness as that shown in FIGS. 5A-5C may be used, but with a smaller central hole, as shown at 70C in FIG. 6C.

Figure 6C:
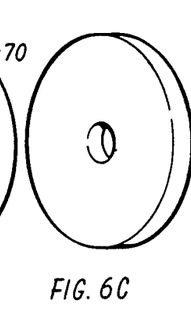

For still higher spans of, say, from 0-250 psi to 0-1000 psi or from 0-750 psi to 0-2000 psi, the same washer 70C can be employed, without however using any valve 40 for high-side protection. This is because the thickness of the chip upper part 60 will, for those spans, be sufficient to prevent damage from high-side overrange pressures up to 2000 psi. If the pressure reaches such an overrange value, the washer 70C may touch the opposite flat surface of the support member 30, but this will have no effect on the operation of the instrument. It should be noted, however, that even though the high-side overrange valve 40 may be omitted for these high differential-pressure instruments, it still is important to include the low-side overrange valve 42, to avoid any damage due to low-side (reverse) differential pressure of greater than about 15 psi.

It will be seen from the above description that the present invention provides a differential-pressure meter having important advantages. The overrange protection arrangement assures effective functioning without significant errors due to changes in temperature. It offers economical manufacture, especially by making it possible to provide a series of essentially identical instruments capable of covering all of the conventional process pressure spans, e.g. from a span of zero to 20 inches of water up to a span of zero to 2000 psi.

Although preferred embodiments of the invention have been described hereinabove in detail, this has been for the purpose of illustrating the principles of the invention, and should not necessarily be construed as limiting of the invention since it is apparent that those skilled in the art can make many modified arrangements based on the principles of the invention without departing from the true scope thereof.

What is claimed is:

1. In a differential-pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

that improvement for protecting the instrument from overrange pressure conditions comprising:

a circular spring plate extending completely across said pressure chamber between said diaphragms dividing said pressure chamber into first and second fill-liquid sections and responsive to said differential pressure to effect corresponding deflection thereof;

a valve-closure member secured to one side of said circular spring plate at the center of the circle defining the outer edges of said plate;

valve seat means in the chamber section adjacent said one plate side and operable upon engagement by said valve-closure member to close off liquid communication between the region adjacent said one side and the remainder of the fill-liquid of the corresponding chamber section;

said spring plate being operable to move said valve-closure member into engagement with said valve seat means to close said valve seat means upon deflection of the center of said spring plate by a differential pressure exceeding a predetermined magnitude, whereby the fill-liquid on said one side of said spring plate is locked in place to provide a liquid back-up preventing further deflection of said plate.

2. Apparatus as claimed in claim 1, wherein said valve-closure member is a pad formed of elastomeric material.

3. In a differential-pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

that improvement for protecting the instrument from overrange pressure conditions comprising:

a spring plate between said diaphragms dividing said pressure chamber into first and second fill-liquid sections and responsive to said differential pressure to effect corresponding deflection thereof;

valve means in said chamber sections respectively and operable to close off liquid communication between the region adjacent the corresponding side of said spring plate and the remainder of the fill-liquid of the corresponding chamber section;

said spring plate including means operable to close said valve means upon deflection of said spring plate by a differential pressure exceeding a predetermined magnitude, whereby the fill-liquid on the side of said spring plate where the valve means is closed off is locked in place to provide a liquid back-up preventing further deflection of said plate;

said valve means comprising first and second valves on opposite sides of said spring plate normally providing passageways from the respective regions adjacent the spring plate to the regions adjacent the corresponding diaphragms;

said spring plate having first and second elastomeric pads on opposite sides thereof engageable with valve seats of said valves, respectively, to close off said first or second valves when said spring plate is deflected a sufficient distance towards one or the other of said valves;

a spring member engaged with said spring plate near the periphery thereof;

said spring member being formed to provide for passage of the fill-liquid through the spring member to said spring plate so that the spring plate can be deflected away from said spring member in response to a relatively low differential pressure on the spring member side which is remote from said spring member.

4. Apparatus as claimed in claim 3, wherein said spring member comprises a circular washer.

5. Apparatus as claimed in claim 4, wherein said washer has a central opening to allow passage of fill-liquid therethrough.

6. Apparatus as claimed in claim 3, including a mounting post;

an IC chip serving as said sensing means and mounted on said post to isolate said chip and minimize the transmittal of stresses thereto.

7. In a differential-pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

the method of protecting the instrument from overrange pressure conditions comprising:

positioning a circular spring plate between said diaphragms and extending completely across said pressure chamber to divide said pressure chamber into first and second fill-liquid sections, the input differential pressure being developed across said plate, and the center region of said circular plate being deflectable in response to such differential pressure;

applying the differential pressure across said circular spring plate to said sensing means so as to produce a corresponding output signal; and     causing a valve closure member positioned at the center of said spring plate to move into engagement with a valve seat upon deflection of said spring plate center in response to a pre-set differential pressure, the engagement with said valve seat closing off liquid communication between the fill-liquid region immediately adjacent one side of said spring plate and the remainder of the fill-liquid of the corresponding chamber section upon deflection of the center of said spring plate in an amount corresponding to said pre-set differential pressure, whereby the fill-liquid on said one side of said spring plate is locked in place to provide a liquid back-up preventing further deflection of said plate.

8. The method of claim 7, wherein said valve-closure member is a resilient pad secured to said spring plate.

9. The method of claim 7, wherein the instrument has first and second valve seats on opposite sides of said spring plate adjacent said center region thereof:

the center region of said spring plate being provided with valve-closure members on opposite sides thereof to close off one or the other of said valve seats upon reaching a predetermined deflection in response to either high-side or low-side overrange pressures respectively.

10. In a differential-pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

that improvement for protecting the instrument from overrange pressure conditions comprising:

a spring plate between said diaphragms dividing said pressure chamber into first and second fill-liquid sections and responsive to said differential pressure to effect corresponding deflection thereof;

valve means in at least one of said chamber sections and operable to close off liquid communication between the region adjacent the corresponding side of said spring plate and the remainder of the fill-liquid of that one chamber section;

said spring plate including means operable to close said valve means upon deflection of said spring plate by a differential pressure exceeding a predetermined magnitude, whereby the fill-liquid on said one side of said spring plate is locked in place to provide a liquid back-up preventing further deflection of said plate;

said valve means comprising a valve body threadedly engaged in said instrument to provide for axial adjustment thereof to set the pressure at which the valve is closed.

11. Apparatus as claimed in claim 10, including a second valve body on the opposite side of said plate with reference to said first mentioned valve body and operable to close off liquid communication between the region adjacent said opposite side and the remainder of the fill-liquid of the corresponding chamber section;

said second valve body being threadedly engaged in said instrument to provide for axial adjustment thereof.

12. In a differential pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

that improvement for protecting the instrument from overrange pressure conditions comprising:

a spring plate between said diaphragms dividing said pressure chamber into first and second fill-liquid sections and responsive to said differential pressure to effect corresponding deflection thereof;

an IC chip mounted in said instrument to serve as said sensing means and positioned adjacent a selected one of said chamber sections to receive at one surface the pressure thereof;

liquid passageway means connected to the chamber section opposite said selected section and extending around the outer edge of said spring plate to a region adjacent a surface of said IC chip which is opposite said one surface thereof, whereby said IC chip receives between said two surfaces the differential pressure existing between said two chamber sections;

valve means in one of said chamber sections and operable to close off liquid communication between the region adjacent the corresponding side of said spring plate and the remainder of the fill-liquid of that one chamber section;

said spring plate including means operable to close said valve means upon deflection of said spring plate by a differential pressure exceeding a predetermined magnitude, whereby the fill-liquid on said one side of said spring plate is locked in place to provide a liquid back-up preventing further deflection of said plate.

13. Apparatus as claimed in claim 12, including a mounting post in said instrument adjacent said selected one chamber section;

said IC chip being mounted on said post to isolate said chip and minimize the transmittal of stress thereto.

14. In a differential-pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

the method of protecting the instrument from overrange pressure conditions comprising:

positioning a spring plate between said diaphragms to divide said pressure chamber into first and second fill-liquid sections, the input differential pressure being developed across said plate, and said plate being deflectable in response to such differential pressure;

applying the differential pressure across said spring plate to said sensing means so as to produce a corresponding output signal;

closing of liquid communication between the fill-liquid region immediately adjacent one side of said spring plate and the remainder of the fill-liquid of the corresponding chamber section upon deflection of said spring plate in an amount corresponding to a pre-set differential pressure, whereby the fill-liquid on said one side of said spring plate is locked in place to provide a liquid back-up preventing further deflection of said plate;

said instrument having first and second valve means on opposite sides of said spring plate;

said spring plate being operable to close off one or the other of said valve means upon reaching a predetermined deflection in response to either high-side or low-side over-range pressures respectively;

said spring plate being deflected against different spring rates in responding to said high-side and low-side overrange pressures respectively.

15. In a differential-pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

that improvement for protecting the instrument from overrange pressure conditions comprising:

spring plate means between said diaphragms dividing said pressure chamber into first and second fill-liquid sections and responsive to said differential pressure to effect corresponding deflection thereof;

first and second valve means in said chamber sections respectively and operable to close off liquid communication between the region adjacent the corresponding side of said spring plate means and the remainder of the fill-liquid of that chamber section;

said spring plate means being arranged to resist deflection thereof by different spring rates, depending upon the direction of deflection thereof away from a neutral position, and being operable to close one or the other of said valve means upon deflection of said spring plate means by predetermined amounts.

16. Apparatus as claimed in claim 15, wherein said spring plate means comprises a circular spring plate extending entirely across the chamber and a spring member coupled thereto to provide said different spring rates for different deflection directions.

17. Apparatus as claimed in claim 16, wherein said spring member comprises a second spring plate mounted adjacent the first spring plate and formed with an opening in the center thereof to allow transmission of fluid pressure through said opening to the first spring plate.

18. In a differential pressure measuring instrument of the type including a sealed interior pressure chamber containing a fill-liquid and having a pair of flexible diaphragms through which an input differential pressure may be applied to said fill-liquid, said instrument further including sensing means responsive to said differential pressure to produce a corresponding output signal;

that improvement for protecting the instrument from over-pressure conditions comprising:

a spring plate between said flexible diaphragms and extending completely across said pressure chamber so as to divide said pressure chamber into first and second separated fill-liquid sections;

each of said fill-liquid sections comprising a first region adjacent the flexible diaphragm for that section and a second region adjacent the corresponding side of said spring plate, with said first and second regions being connected by a respective fluid passage;

an IC chip mounted in said instrument to serve as said sensing means and positioned adjacent the second region of a selected chamber section directly opposite the corresponding side of said spring plate, to receive at one surface of the IC chip the pressure of that selected section;

liquid passageway means connected to the chamber section opposite said selected chamber section and extending around the outer edge of said spring plate to a region adjacent a surface of said IC chip which is opposite said one surface thereof, whereby said IC chip receives between said two surfaces thereof the differential pressure existing between said two chamber sections; and means operable, after an amount of fill-liquid has been transferred from one of said first section regions through the corresponding fluid passage to the corresponding second region of that one section adjacent sad spring plate, to prevent further transfer of fill-liquid from said one first section region to the corresponding second region, thereby to prevent damage from over-pressure conditions.

* * * * *